(12) United States Patent
Yamanaka

(10) Patent No.: US 10,018,137 B2
(45) Date of Patent: Jul. 10, 2018

(54) CONTROL DEVICE FOR FUEL INJECTION SYSTEM

(71) Applicant: HONDA MOTOR CO., LTD., Tokyo (JP)

(72) Inventor: Tatsuo Yamanaka, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 15/528,268

(22) PCT Filed: Nov. 19, 2015

(86) PCT No.: PCT/JP2015/082590
§ 371 (c)(1),
(2) Date: May 19, 2017

(87) PCT Pub. No.: WO2016/080499
PCT Pub. Date: May 26, 2016

(65) Prior Publication Data
US 2017/0328293 A1 Nov. 16, 2017

(30) Foreign Application Priority Data

Nov. 21, 2014 (JP) ................................ 2014-236945
Apr. 7, 2015 (JP) ................................ 2015-078511

(51) Int. Cl.
*F02M 37/08* (2006.01)
*F02D 41/20* (2006.01)
(Continued)

(52) U.S. Cl.
CPC ........... *F02D 41/20* (2013.01); *F02D 41/062* (2013.01); *F02D 41/3082* (2013.01);
(Continued)

(58) Field of Classification Search
CPC .... F02D 41/20; F02D 41/062; F02D 41/3082; F02D 41/401; F02D 2041/2006;
(Continued)

(56) References Cited

U.S. PATENT DOCUMENTS

2009/0183714 A1  7/2009  Mayuzumi

FOREIGN PATENT DOCUMENTS

| JP | 7-42641 A | 2/1995 |
|---|---|---|
| JP | 11-210533 A | 8/1999 |
| JP | 2012-145119 A | 8/2012 |

OTHER PUBLICATIONS

International Search Report dated Jan. 19, 2016, issued in counterpart of International Application No. PCT/JP2015/082590 (1 pages).

*Primary Examiner* — Hai Huynh
(74) *Attorney, Agent, or Firm* — Westerman, Hattori, Daniels & Adrian, LLP

(57) ABSTRACT

A control device for a fuel injection system includes a CPU which generates a drive signal for instructing execution of compression by a fuel pump; a fuel pump drive circuit which controls application of electric power to a solenoid of the fuel pump based on the drive signal; a boost circuit provided with a capacitor for storing electric power to be used for driving an injector; a charging circuit which leads a current generated when the application of electric power to the solenoid is stopped to the capacitor; and an excess electric power consumption circuit which consumes excess electric power of the capacitor. While fuel injection from the injector is stopped, the CPU counts the number of times the fuel pump is driven and turns off the drive signal so as to stop driving the fuel pump as soon as the drive count has exceeded a predetermined count value.

8 Claims, 14 Drawing Sheets

(51) Int. Cl.
  *F02D 41/40*   (2006.01)
  *F02D 41/30*   (2006.01)
  *F02D 41/06*   (2006.01)
  F02D 41/22    (2006.01)
  H02M 1/32     (2007.01)

(52) U.S. Cl.
  CPC .... *F02D 41/401* (2013.01); *F02D 2041/2006* (2013.01); *F02D 2041/2089* (2013.01); *F02D 2041/226* (2013.01); *F04C 2210/203* (2013.01); *H02M 1/32* (2013.01)

(58) Field of Classification Search
  CPC ...... F02D 2041/2089; F02D 2041/226; H02M 1/32; F02M 63/024
  USPC ................. 123/478, 490, 497, 510, 511, 457
  See application file for complete search history.

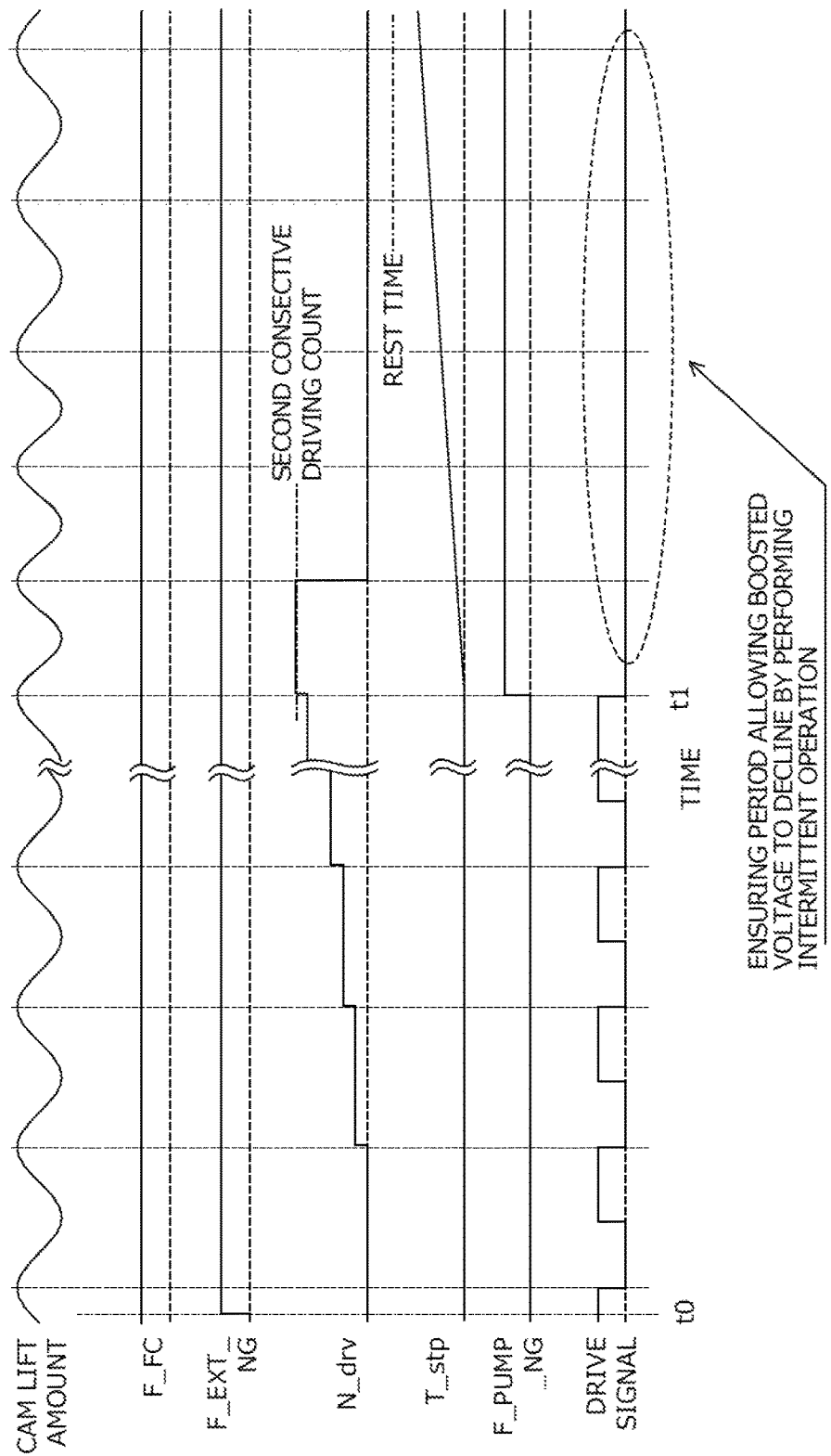

CONTROL DEVICE FOR FUEL INJECTION SYSTEM

TECHNICAL FIELD

The present invention relates to a control device for a fuel injection system. In more detail, it relates to a control device for a fuel injection system provided with a fuel pump that compresses fuel for an internal combustion engine, and injectors that inject the compressed fuel.

BACKGROUND ART

A high-pressure fuel pump of an internal combustion engine pressurizes the fuel supplied from the fuel tank, and supplies this high-pressure fuel to injectors provided to the internal combustion engine. The high-pressure fuel pump includes a pump shaft that rotates synchronously with the rotation of the internal combustion engine, and a plunger that reciprocates inside a cylinder according to the profile of this pump shaft, and high-pressure fuel is produced by compressing the fuel introduced to a pressurizing chamber by this plunger. In addition, an electromagnetic valve is provided to a low-pressure fuel line from a fuel introduction part to the pressurizing chamber. The flowrate of fuel introduced to the pressurizing chamber is controlled by driving the electromagnetic valve to open and close based on drive signals to turn ON or OFF synchronously with the reciprocating of the plunger (i.e. rotation of internal combustion engine).

Patent Document 1 shows a control device for a fuel pump including a charging circuit for causing the surge current generated upon stopping energization of the fuel pump to an electromagnetic valve to regenerate in a boost capacitor of a booster circuit serving as the power source for driving injectors. It is thereby possible to efficiently employ the surge energy in the driving of injectors, while quickly dropping the energization current of the electromagnetic valve.

Patent Document 1: Japanese Unexamined Patent Application, Publication No. 2012-145119

DISCLOSURE OF THE INVENTION

Problems to be Solved by the Invention

However, in the case of charging a boost capacitor by way of the aforementioned such charging circuit, it is necessary to additionally take measures for preventing excessive voltage rise in which the voltage of the booster circuit exceeds a specified value. As a counter-measure for such excessive voltage rise, providing a surplus power consumption circuit in parallel with the booster circuit, and protecting the booster circuit from excessive voltage rise by consuming the surplus power using this surplus power consumption circuit can be exemplified.

However, such a surplus power consumption circuit also has a limit to the power that can be consumed within a limited time. For this reason, in the case of continuously driving the fuel pump while a state of the voltage of the booster circuit being high without the injector being driven is maintained, for example, there is a risk of an abundance of current flowing to the surplus power consumption circuit and reaching failure.

The present invention has an object of providing a control device for a fuel injection system that regenerates the current generated upon stopping energization of the fuel pump to an electromagnetic valve in a driving circuit of injectors, and protects the driving circuit of injectors or a surplus power consumption circuit provided for protecting this.

Means for Solving the Problems

According to a first aspect of the present invention, a control device (for example, the ECU 6 described later) for a fuel injection system (for example, the fuel injection system S described later) includes: a compression command generation device (for example, the CPU 63 described later) that commands compression by way of the fuel pump (for example, the fuel pump 5 described later); a fuel-pump drive circuit (for example, the fuel-pump drive circuit 61 described later) that performs energization control of an electromagnetic valve (for example, the solenoid 553 described later) of the fuel pump based on a command from the compression command generation device; an injector drive circuit (for example, the booster circuit 62 described later) that includes a power storage element (for example, the capacitor 625 described later) for storing electric power to be used in driving of the injector (for example, the injector 4 described later); a charging circuit (for example, the charging circuit 64 described later) that leads current generated during energization stop of the electromagnetic valve to the power storage element; and a surplus power consumption circuit (for example, the surplus power consumption circuit 65 described later) that consumes surplus electric power of the power storage element, in which the compression command generation device counts a driving count of the fuel pump in a period for which fuel injection from the injector is stopped, and commands stopping of the energization control in response to the driving count (N_drv) exceeding a predetermined count.

According to a second aspect of the present invention, in this case, it is preferable for the compression command generation device, in a case of being during cranking of the internal combustion engine, to command execution of the energization control until the driving count (N_drv) counted since a moment of starting the cranking exceeds a predetermined upper limit count (for example, the upper limit count described later), and after the driving count exceeds the upper limit count, to command stopping of the energization control.

According to a third aspect of the present invention, in this case, it is preferable for the predetermined upper limit count to be decided in order to protect the surplus power consumption circuit.

According to a fourth aspect of the present invention, in this case, it is preferable for the fuel injection system to be equipped to a hybrid vehicle (for example, the hybrid vehicle V described later) with an electric motor (for example, the motor M described later) and the internal combustion engine as motive power sources to cause a drive wheel (for example, the drive wheel W described later) to rotate, and for the cranking to be performed by way of the electric motor.

According to a fifth aspect of the present invention, in this case, it is preferable for the fuel injection system to include a delivery pipe (for example, the delivery pipe 3 described later) that stores high-pressure fuel compressed by the fuel pump, and for the compression command generation device, in a case of being during fuel cut accompanying deceleration of the internal combustion engine and fuel pressure within the delivery pipe being no more than a predetermined value, to continually command execution of the energization control until the driving count (N_drv) exceeds a predetermined first consecutive count (for example, the first consecutive driving count described later), and then to repeatedly perform intermittent operation to continually command stopping of the energization control until a predetermined first rest period (for example, period until the discrete value N_stp of the stop count counter exceeds the rest count) elapses.

According to a sixth aspect of the present invention, in this case, it is preferable for the predetermined first consecutive count and first rest interval to be decided in order to protect the surplus power consumption circuit.

According to a seventh aspect of the present invention, in this case, it is preferable for the control device to further include a failure detection device (for example, the CPU 63 described later) that detects an event of the surplus power consumption circuit having failed, in which, in a case of being within a period in which fuel injection from the injector is stopped and failure of the surplus power consumption circuit is detected, the compression command generation device continually commands execution of the energization control until the driving count (N_drv) exceeds a predetermined second consecutive count (for example, the second consecutive driving count described later), and then repeatedly performs intermittent operation to continually command stopping of the energization control until a predetermined second rest interval (for example, period until the discrete value T_stp of the stop time timer exceeds the stop time described later) elapses.

According to an eighth aspect of the present invention, in this case, it is preferable for the predetermined second consecutive count and the second rest interval to be decided in order to protect the injector drive circuit.

Effects of the Invention

According to the first aspect of the present invention, by connecting the fuel-pump drive circuit and injector drive circuit by the charging circuit, it is possible to efficiently use surge energy in the driving of injectors, while causing the energization current of the electromagnetic valve to quickly decline. In the present invention, by further providing the surplus power consumption circuit that consumes the surplus electric power of the power storage element in addition to the charging circuit, it is possible to prevent excessive voltage rise of the power storage element. In addition, in the period in which fuel injection is stopped, the electric power stored in the power storage element is not consumed in the driving of injectors, and thus this voltage hardly declines. For this reason, the frequency increases at which the surplus power consumption circuit operates so that the power storage element does not reach excessive voltage rise. With the present invention, in the period in which fuel injection from the injectors is stopped, the driving count of the fuel pump is counted, and energization control of the fuel pump is stopped in response to this driving count having exceeded a predetermined count. It is thereby possible to provide a period allowing the surplus power consumption circuit to cool before the surplus power consumption circuit operates frequently in the period in which fuel injection is stopped, and reaches excessive temperature rise. In addition, in the case of the surplus power consumption circuit, not operating for any reason, the surge current generated by energization control of the fuel pump is all supplied to the power storage element, and there is concern over the power storage element reaching excessive voltage rise. With the present invention, even in a case such that the surplus power consumption circuit does not operate, it is possible to provide a period prior to the power storage element reaching excessive voltage rise for lowering the voltage thereof, by stopping energization control of the fuel pump in response to the driving count of the fuel pump exceeding the predetermined count. According to the present invention, it is thereby possible to protect the surplus power consumption circuit and injector drive circuit.

In the second aspect of the present invention, in the case of being during cranking of the internal combustion engine, energization control is executed until the driving count counted from the moment of starting cranking exceeds the predetermined upper limit count, and stopping of energization control is commanded until fuel injection is permitted after exceeding the upper limit count. It is thereby possible to provide a period allowing the surplus power consumption circuit to cool, prior to the surplus power consumption circuit operating frequently during cranking and reaching excessive temperature rise.

In the third aspect of the present invention, the driving count of the fuel pump during cranking is limited using the upper limit count decided in order to protect the surplus power consumption circuit. If is thereby possible to limit the driving count of the fuel pump during cranking by an appropriate count decided so that the surplus power consumption circuit is reliably protected.

According to the fourth aspect, due to performing cranking of the internal combustion engine using the electric motor for causing the drive wheels to rotate in a hybrid vehicle, the revolution speed of the internal combustion engine during cranking is higher than a case of performing cranking of an internal combustion engine using a starter motor. The fuel pump compresses fuel using the rotation of the crankshaft of the internal combustion engine, the driving count of the fuel pump also quickly rises when the revolution speed of the internal combustion engine increases, and thus the operation frequency of the surplus power consumption circuit also rises. In the present invention, it is possible to appropriately protect the surplus power consumption circuit by limiting the driving count of the fuel pump during cranking by the upper limit count in a hybrid vehicle in this way.

In the fifth aspect of the present invention, in the case of being during fuel cut accompanying deceleration of the internal combustion engine and the fuel pressure within the delivery pipe being no more than a predetermined value, energization control is performed until the driving count of the fuel pump exceeds a first consecutive count, and then intermittent operation to stop energization control is repeatedly performed until the first rest period elapses. It is thereby possible to alternately provide a period allowing the surplus power consumption circuit to operate, and a period allowing the surplus power consumption circuit to cool. It is thereby possible to prevent the surplus power consumption circuit from reaching excessive temperature rise during fuel cut. In addition, with the present invention, it is possible to cause the fuel pressure within the delivery pipe to rise as much as possible in preparation for recovery from fuel cut, by way of intermittently operating the fuel pump.

In the sixth aspect of the present invention, intermittent operation of the fuel pump is performed using the first consecutive count and first rest period decided in order to protect the surplus power consumption circuit. It is thereby possible to perform intermittent operation of the fuel pump during fuel cut in the appropriate situation decided so that the surplus power consumption circuit is reliably protected.

In the seventh aspect of the present invention, in the case of being within a period in which fuel injection from the injectors is stopped and failure of the surplus power consumption circuit is detected, energization control is performed until the driving count of the fuel pump exceeds the second consecutive count, and then intermittent operation to stop the energization control is repeatedly performed until the second rest period elapses. It is thereby possible to alternately provide a period allowing the voltage of the power storage element to increase by charging, and a period allowing the voltage of the power storage element to decline by discharging, by anticipating that the surplus power consumption circuit is failing. It is thereby possible to prevent the power storage element from reaching excessive voltage rise, even in a case of the surplus power consumption circuit failing.

In the eighth aspect of the present invention, in the case of failure of the surplus power consumption circuit being detected, intermittent operation of the fuel pump is performed using the second consecutive count and second rest period decided in order to protect the injector drive circuit. It is thereby possible to perform intermittent operation of the fuel pump during fuel cut in an appropriate situation decided so that the injector drive circuit is reliably protected.

BRIEF DESCRIPTION OF THE DRAWINGS

FIG. 14 is a time chart in a case of repeatedly executing the processing of FIG. 13.

PREFERRED MODE FOR CARRYING OUT THE INVENTION

Figure 1:
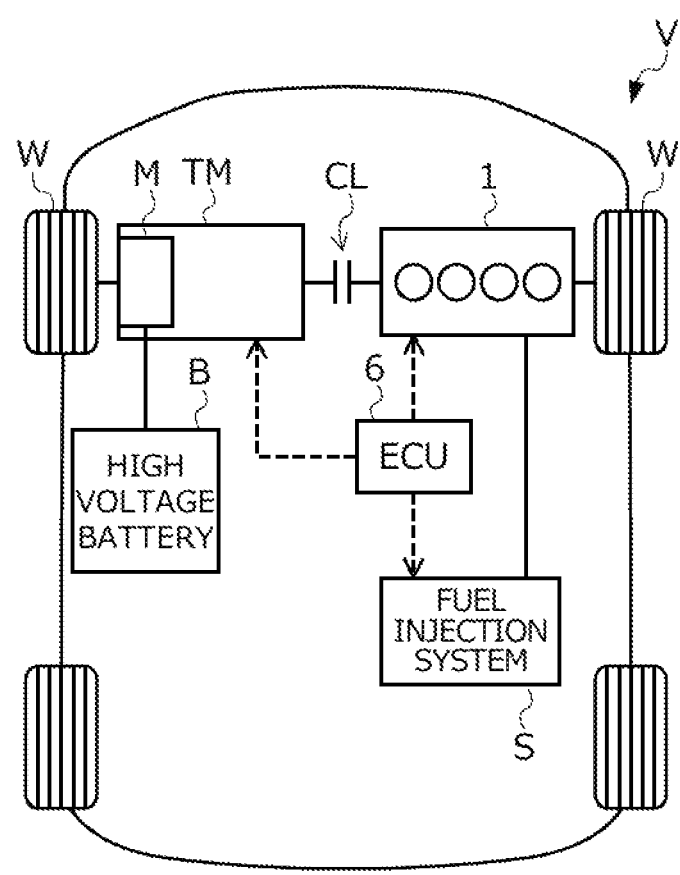
FIG. 1 is a view showing the configuration of a hybrid vehicle equipped with a fuel injection system according to an embodiment of the present invention.

Hereinafter, an embodiment of the present invention will be explained by referencing the drawings. FIG. 1 is a view showing the configuration of a vehicle V equipped with a fuel injection system S according to the present embodiment.

The vehicle V includes: an engine 1; a motor M; the fuel injection system S that supplies fuel to the engine 1; a high-voltage battery B that supplies power to the motor M; a transmission TM that changes the speed of an output of the motor M and engine 1; a clutch CL that disengages/engages the crankshaft of the engine 1 and the output shaft of the motor M; and an electronic control unit (hereinafter referred to as "ECU") 6 for controlling these. This vehicle V is a so-called hybrid vehicle establishing the motor M and engine 1 as the motive power sources causing drive wheels W to rotate.

In the vehicle V, the ECU 6 controls so as to perform EV travel for disengaging the clutch CL and cylinder cut-off operation of the engine 1, and travelling with only the motor M serving as the motive power source, and controls so as to engage the clutch CL while performing this EV travel, perform cranking of the engine 1 using the motor M, and perform HEV travel for traveling with the engine 1 and motor M serving as the motive power sources.

Figure 2:
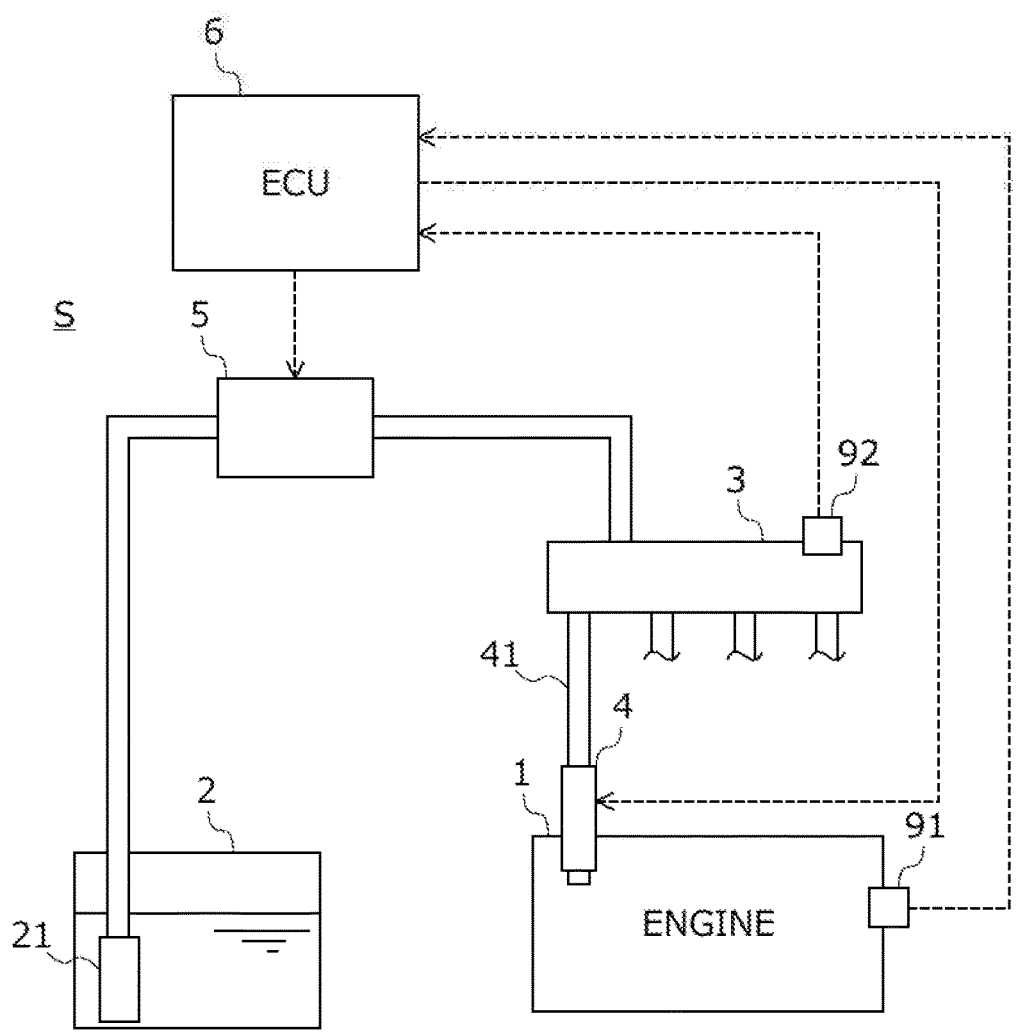
FIG. 2 is a view showing the configurations of a fuel injection system and ECU.

FIG. 2 shows the configurations of the fuel injection system S and ECU 6 as the control device thereof. The fuel injection system S includes a fuel tank 2, high-pressure fuel pump 5, delivery pipe 3 and injectors 4.

The fuel tank 2 stores fuel that was filled from outside. A fuel pump unit 21 that pressure feeds fuel to the high-pressure fuel pump 5 is provided in the fuel tank 2. The high-pressure fuel pump 5 further compresses the fuel pressure fed from the fuel pump unit 21 using power generated by the engine 1, and supplies to the delivery pipe 3. The specific configuration of this high-pressure fuel pump 5 will be explained by referencing FIG. 3 later.

The delivery pipe 3 stores high-pressure fuel discharged from the high-pressure fuel pump 5. The injectors 4 are provided for each of the plurality of cylinders of the engine 1. These injectors 4 are connected with the delivery pipe 3 via a fuel supply line 41. The ECU 6 directly injects the high-pressure fuel within the delivery pipe 3 into each cylinder of the engine 1, by driving the injectors 4 to open and close at the appropriate timing according to the operating state of the engine 1.

The ECU 6 is an electronic control unit that controls the various devices provided to the engine 1 and fuel supply system S, and is configured by a CPU, drive circuits for driving the various devices based on computations of the CPU, etc. A plurality of sensors 91, 92 for grasping the states of the engine 1 and fuel supply system S are connected to this ECU 6.

A crank-angle sensor 91 sends a pulse signal every predetermined crank angle to the ECU 6, according to the rotation of the crankshaft (not illustrated) of the engine 1. The position of the crankshaft and revolution speed are grasped by the ECU 6 based on the pulse signal from this crank angle sensor 91.

The fuel pressure sensor 92 detects the fuel pressure within the delivery pipe 3, and sends a signal that is substantially proportional to the detection value to the ECU 6. The ECU 6 controls the amount of fuel discharged from the high-pressure fuel pump 5 to the delivery pipe 3 (hereinafter referred to as "fuel discharge amount"), based on the detection signal from this fuel pressure sensor 92.

Figure 3:
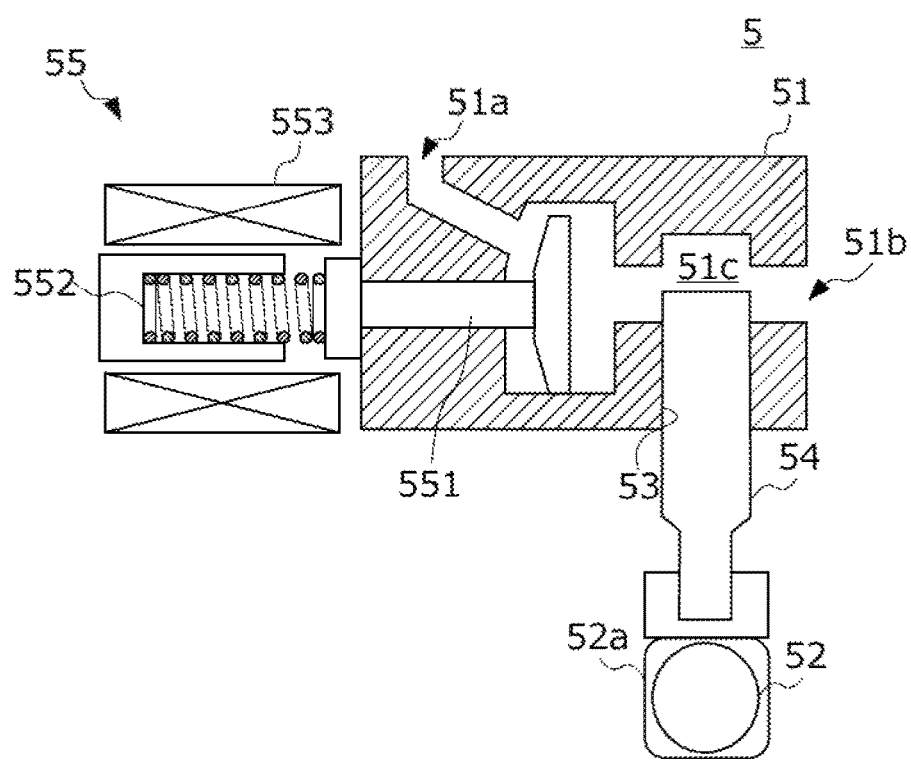
FIG. 3 is a view showing the configuration of a high-pressure fuel pump.

FIG. 3 is a view showing the configuration of the high-pressure fuel pump 5. The high-pressure fuel pump 5 includes: a housing 51 in which an inlet part 51a and discharge part 51b for fuel are formed, a pump shaft 52, a cylinder 53 that is formed inside of the housing 51 and extends in a radial direction of the axis of rotation of the pump shaft 52, a plunger 54 accommodated to be able to reciprocally move inside of this cylinder 53, and a flow-rate control valve 55 that controls the flowrate of fuel flowing into a pressurization chamber 51c formed within the cylinder 53. With this high-pressure fuel pump 5, fuel from the inlet part 51a is introduced to the pressurization chamber 51c, and high-pressure fuel is discharged from the discharge part 51b by compressing the fuel within the pressurization chamber 51c with the plunger 54.

The pump shaft 52 is coupled with the crankshaft of the engine 1, and will rotate synchronously with the crankshaft. When the pump shaft 52 rotates, the plunger 54 reciprocally moves within the cylinder 53 following the shape of a cam part 52a formed on this pump shaft 52. The plunger 54 is made so as to reciprocate once every 240 degrees of crank angle, for example.

The flow-rate control valve 55 is an electromagnetic valve including: a rod-shaped valve body 551 that opens and closes the pressurizing chamber 51c, a spring 552 that biases this valve body 551 to the open direction, and a solenoid 553 that drives the valve body 551 against the elastic force of this spring 552 to the closed direction by way of electromagnetic force when energized. FIG. 3 shows a state in which the solenoid 553 is a non-excited condition, and the valve body 551 is seated by way of the elastic force of the spring 552 (open state). In other words, the flow-rate control valve 55 is of so-called normal-open type which is fully open in the non-excited condition; however, the present invention is not to be limited thereto.

Figure 4:
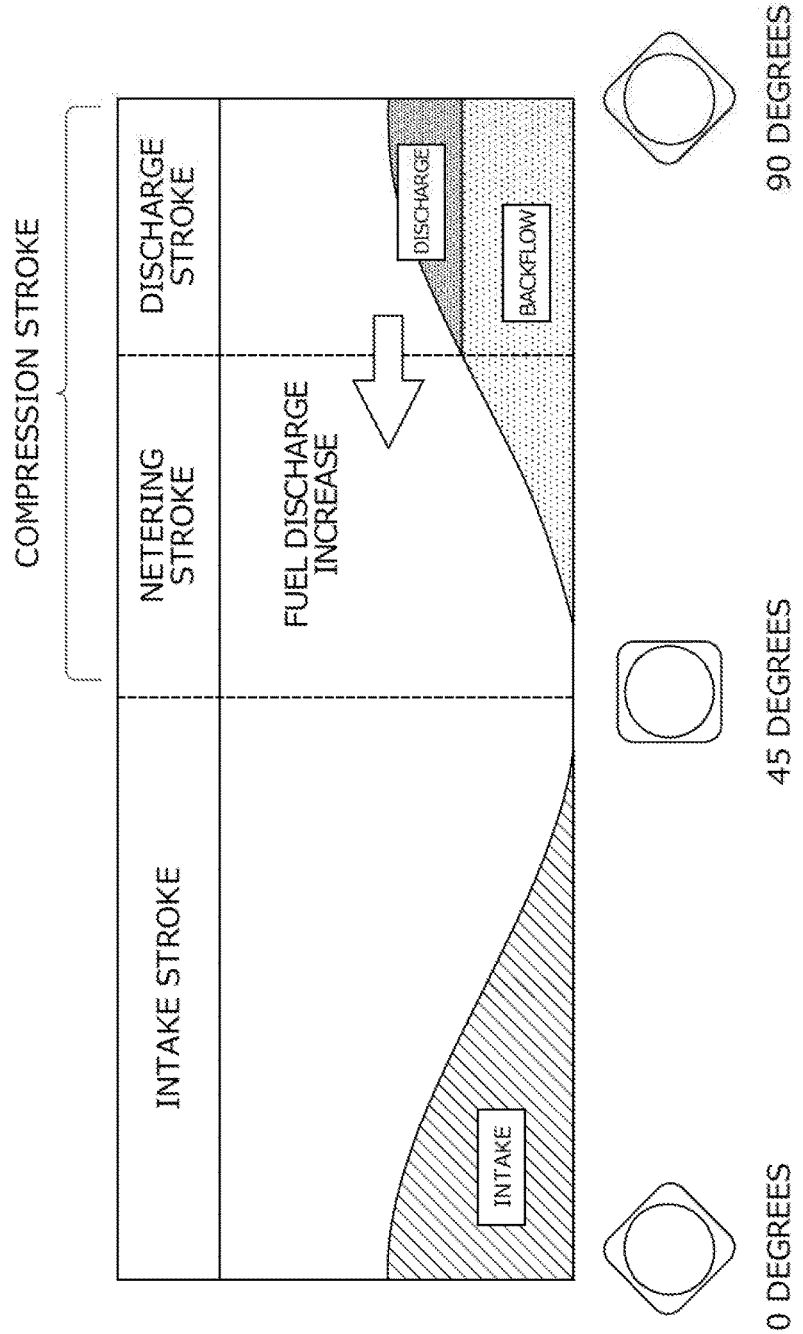
FIG. 4 is a view showing a sequence of discharging high-pressure fuel from the high-pressure fuel pump.

Next, a sequence of discharging high-pressure fuel by way of the above such high-pressure fuel pump 5 will be explained while referencing FIG. 4. As shown in FIG. 4, the time from the state in which the plunger is at top dead center until reaching bottom dead center and then reaching top dead center again is defined as one cycle of fuel compression motion by the plunger. This cycle is divided into an suction stroke which is a segment in which the plunger moves from top dead center to bottom dead center, and a compression stroke which is a segment in which the plunger moves from bottom dead center to top dead center.

In the suction stroke, fuel is suctioned from the inlet part 51a into the pressurizing chamber 51c by way of the negative pressure generated accompanying the movement of the plunger. Therefore, in the case of trying to discharge high-pressure fuel by way of the fuel pump, the flow-rate control valve is controlled to the open state (state stopping energization to the solenoid) in at least part of the segment of the suction stroke, so that fuel flows from the inlet part 51a to the pressurizing chamber 51c.

In the compression stroke, the fuel within the pressurizing chamber 51c is compressed by the plunger. Herein, if the flow-rate control valve is in the open state upon the plunger moving from the bottom dead center to top dead center, fuel flows back from the pressurizing chamber 51c to the inlet part 51a, and the amount of fuel discharged from the discharge part 51b decreases. Therefore, in the case of trying to discharge high-pressure fuel by way of the fuel pump, the flow-rate control valve is controlled to the closed state (state energizing the solenoid) for at least part of the segment of the compression stroke, so that fuel is compressed within the pressurizing chamber 51b and is discharged from the discharge part 51b. As shown in FIG. 4, the compression stroke is divided into a metering stroke in which the flow-rate control valve is the open state and is a state in which the fuel of the pressurizing chamber 51c flows back to the inlet part 51a, and a discharge stroke in which the flow-rate control valve is the closed state, and fuel of the pressurizing chamber 51c is discharged from the discharge part 51b.

Therefore, the amount of fuel flowing back from the pressurizing chamber 51c to the inlet part 51a becomes smaller in the compression stroke with a shorter metering stroke, i.e. with closing the flow-rate control valve earlier, and consequently, the fuel discharge amount of the high-pressure fuel pump increases. In other words, with the above such high-pressure fuel pump, it is possible to control the fuel discharge amount by adjusting the closed interval of the flow-rate control valve.

In order to discharge high-pressure fuel by way of the fuel pump in the above way, the flow-rate control valve must be opened and closes during the cycle of the fuel compression motion of the plunger. In the present invention, the matter of performing energization control of the flow-rate control valve synchronously with cyclic motion of the plunger so that high-pressure fuel is discharged by the fuel pump is referred to simply as driving the fuel pump. In addition, the cycle of compression motion of this fuel pump is also referred to as discharge cycle of fuel pump.

Figure 5:
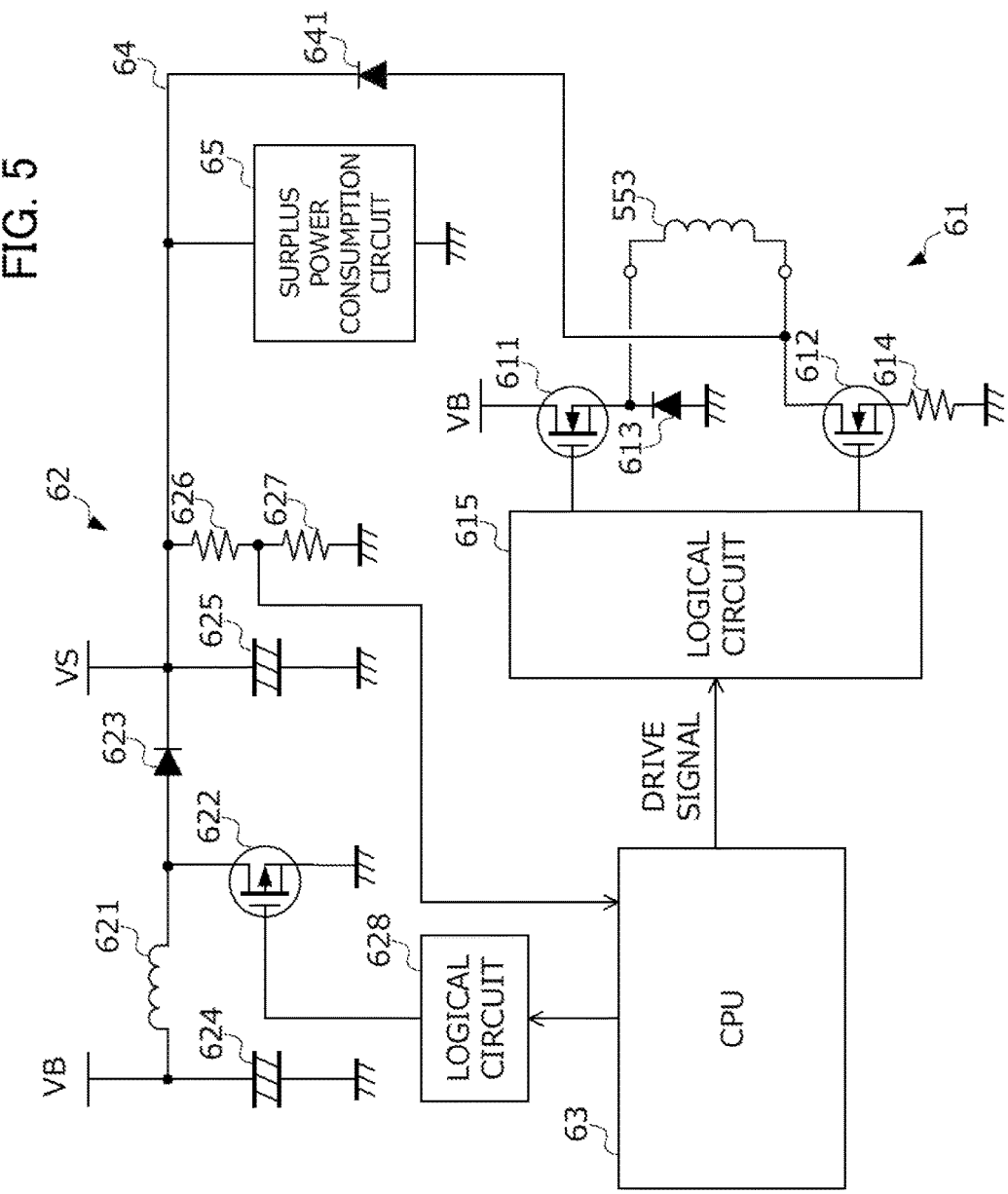
FIG. 5 is a view showing the configurations of a solenoid of a flow-rate control valve and an ECU.

FIG. 5 is a view showing the configurations of the solenoid 553 of the flow-rate control valve and the ECU 6. The ECU 6 includes: a fuel-pump drive circuit 61 for performing energization control of the solenoid 553 of the fuel pump, a booster circuit 62 serving as the power source of the drive current supplied to the injectors (not illustrated), a CPU 63 that executes computations following a predetermined program to generate various command signals, a charging circuit 64 that connects the fuel-pump drive circuit 61 and the booster circuit 62, and a surplus power consumption circuit 65 that protects the booster circuit 62.

The booster circuit 62 is configured by combining a booster coil 621, a switching element 622 for energizing/cutting-off current flowing to the booster coil 621, a backflow preventing diode 623, capacitors 624, 625, voltage monitoring resistors 626, 627, a logical circuit 628 that turns ON/OFF the switching element 622 according to a command signal from the CPU 63; and boosts the output voltage VB (for example, 13 V) of the battery (not illustrated) and outputs a boosted voltage VS. In the booster circuit 62, when between the drain and source is conducting/cut-off under a predetermined switching frequency according to the signal outputted from the logical circuit 628 based on the command from the CPU 63, the output voltage VB of the battery is boosted via the booster coil 621. The boosted voltage VS is applied to the capacitor 625, whereby the capacitor 625 is charged. The boosted voltage VS of this booster circuit 62 is used in the driving of injectors (not illustrated). The CPU 63 turns ON/OFF the switching element 622 so that the boosted voltage VS is maintained at the driving voltage (for example, 40 V) of the injectors set in advance.

The fuel-pump drive circuit 61 includes: a Hi-side switching element 611 and Lo-side switching element 612 provided to the upstream side and downstream side, respectively, in the energizing path of the solenoid 553 from the battery until the gland, a reflux diode 613 for flowing surge current refluxing from the gland to the solenoid 553 when the Hi-side switching element 611 turns OFF, a current monitoring resistor 614, a logical circuit 615 for turning ON/OFF these switching elements 611, 612 based on the drive signal sent from the CPU 63; and performs energization control of the solenoid 553 based on the drive signal sent from the CPU 63.

The Hi-side switching element 611 connects the battery and the solenoid 553, when the output signal from the logical circuit 615 becomes ON, and isolates the battery and the solenoid 553 when the output signal becomes OFF. The Lo-side switching element 612 connects the solenoid 553 and the gland when the output signal from the logical circuit 615 becomes ON, and starts energization to the solenoid 553. In addition, the Lo-side switching element 612 isolates the solenoid 553 and gland when the output signal from the logical circuit 615 becomes OFF, and stops energization to the solenoid 553.

The charging circuit 64 is configured by connecting between the solenoid 553 of the fuel-pump drive circuit 61 and the Lo-side switching element 612 and the capacitor 624 of the booster circuit 62 with the backflow preventing diode 641, and leads the surge current generated during energization stop of the solenoid 553 to the capacitor 625.

The surplus power consumption circuit 65 is a circuit equipped with a function of preventing excessive voltage rise of the booster circuit 62, by consuming the amount that is surplus among the power supplied from the charging circuit 64 to the above-mentioned capacitor 625. More specifically, the surplus power consumption circuit 65 operates when the boosted voltage VS of the booster circuit 62 exceeds a predetermined protection voltage VL set in order to protect the booster circuit 62, and consumes the surplus power of the capacitor 625. The surplus power consumption circuit 65 equipped with such a function is configured by combining existing electrical components such as a Zener diode and resistive element.

Referring back to FIG. 5, the CPU 63 generates a drive signal to define the drive interval to energize the solenoid 553 (open interval and closed interval of flow-rate control valve), based on the output of the crank angle sensor and the output of the fuel pressure sensor. The specific sequence of generating this drive signal will be explained later by referencing FIG. 7 and higher.

Figure 6:
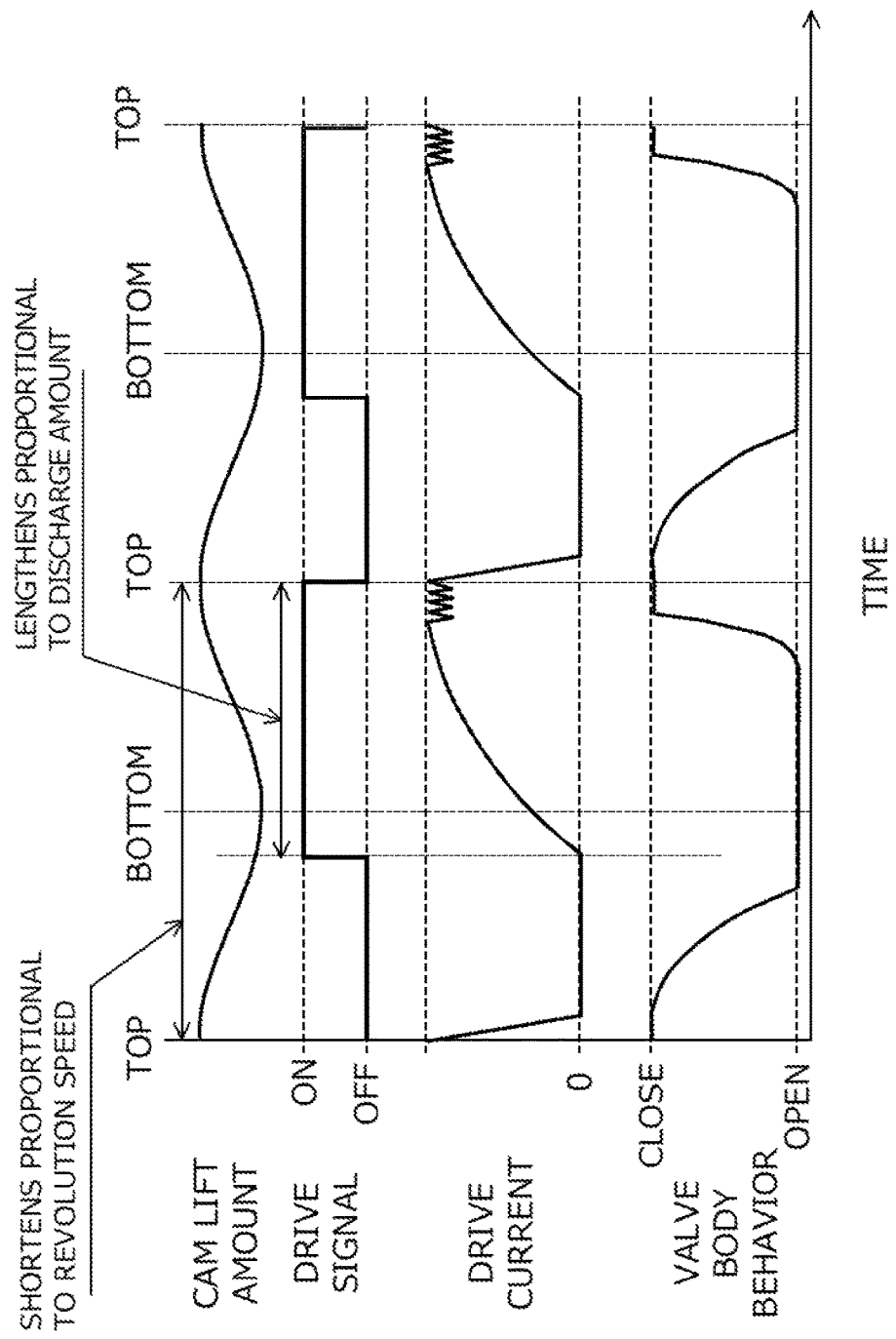
FIG. 6 is a time chart showing a driving example of the high-pressure fuel pump.

FIG. 6 is a time chart showing a driving example of the high-pressure fuel pump. FIG. 6 shows, in order from the top, a cam lift amount corresponding to the movement amount of the plunger, a drive signal generated by the CPU, a drive current flowing through the solenoid, and the actual behavior of the valve body. In addition, FIG. 6 shows an example of keeping constant both the revolution speed of the engine and the fuel discharge amount.

As mentioned above, the pump shaft of the high-pressure fuel pump rotates synchronously with the crankshaft of the engine, and thus the fluctuation cycle of the cam lift amount (discharge cycle of fuel pump) becomes shorter in proportion to the engine revolution speed. Herein, when switching the drive signal between ON and OFF synchronously with the discharge cycle, the Hi-side and Lo-side switching elements are turned ON in response thereto, drive current is supplied to the solenoid as shown in FIG. 6, and the valve body is opened and closed. In addition, the compressed fuel is discharged according to opening and closing the valve body synchronously with the discharge cycle by configuring in this way.

Figure 7:
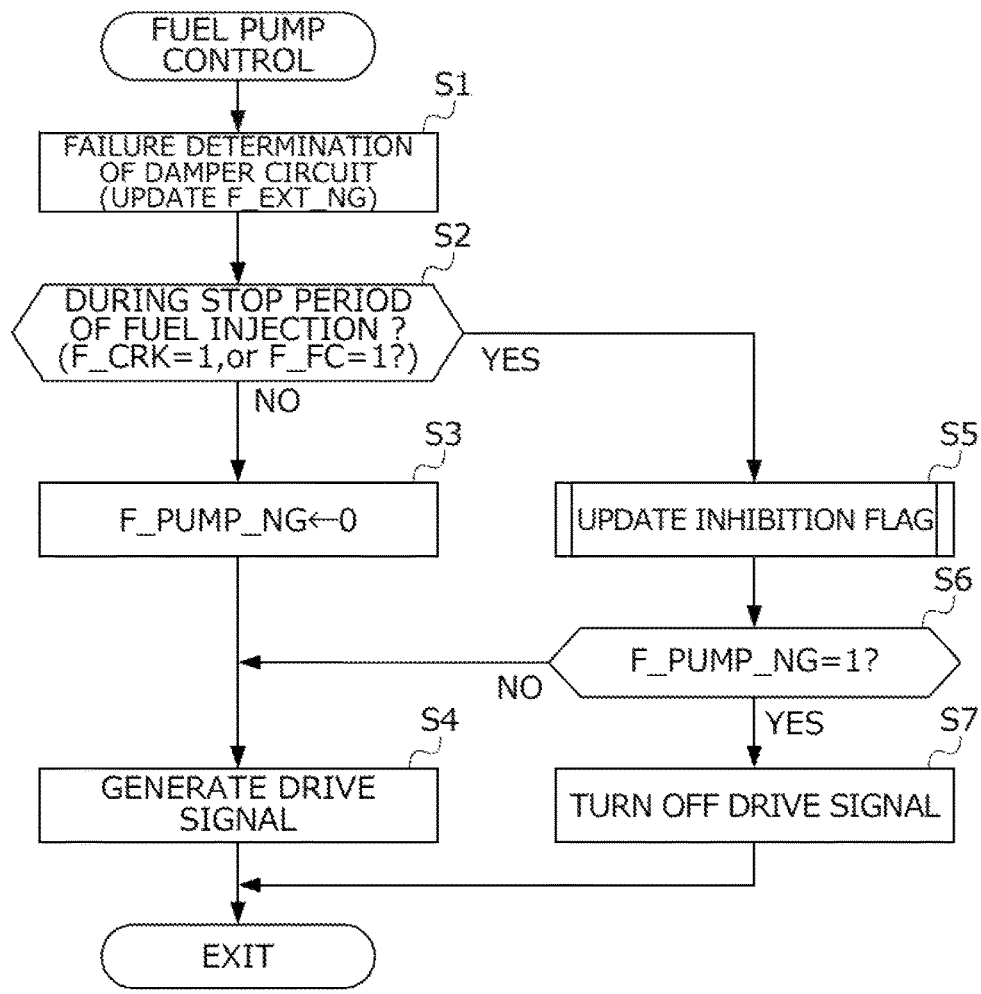
FIG. 7 is a flowchart for processing to drive the fuel pump.

FIG. 7 is a flowchart showing a specific sequence of driving the fuel pump. More specifically, FIG. 7 is a flowchart showing the sequence of generating a drive signal for driving the fuel pump every discharge cycle of the fuel pump in the CPU. The processing shown in FIG. 7 is executed in the CPU every discharge cycle of the fuel pump in a period in which compression of fuel by the fuel pump is possible, i.e. period in which the pump shaft of the fuel pump is rotating.

First, in Step S1, the CPU executes processing to determine failure of the surplus power consumption circuit, and then advances to Step S2. In this processing of Step S1, it is determined whether or not the surplus power consumption circuit has not failed (i.e. whether or not the surplus power consumption circuit is in a state that can exhibit the function of protecting the booster circuit from excessive voltage rise), and in the case of determining as failing, sets a failure flag F_EXT_NG indicating that the surplus power consumption circuit is in a failed state to "1".

In Step S2, the CPU determines whether or not currently being a period in which fuel injection from the injectors is stopped. As the period in which the pump shaft is rotating and fuel injection from the injectors is stopped, specifically the two periods can exemplified of during cranking of the engine, and during fuel cut accompanying deceleration of the engine. In Step S2, the CPU determines whether or not being a period in which fuel injection is stopped by determining whether or not any among a flag F_CRK indicating as being during cranking of the engine and a flag F_FC indicating as being during fuel cut accompanying deceleration of the engine is "1". It should be noted that a detailed explanation for the processing of updating these flags F_CRK and F_FC is omitted.

In the case of the determination in Step S2 being NO, the CPU resets the inhibition flag F_PUMP_NG to "0" (Step S3), and advances to Step S4. This inhibition flag F_PUMP_NG is a flag elucidating as currently being a state in which driving of the fuel pump is inhibited. So long as being within a period in which fuel is being injected from the injectors, since the electric charge stored in the booster capacitor of the booster circuit is successively discharged in order to drive the injectors, it is not necessary to stop driving of the fuel pump in order to prevent excessive voltage rise of the booster circuit. For this reason, the inhibition flag F_PUMP_NG is set to "0" while fuel is being injected from the injectors.

In Step S4, the CPU generates a drive signal for energization controlling the solenoid, in order to discharge high-pressure fuel from the fuel pump during the present discharge cycle. More specifically, the drive signal is generated based on the detection value of the fuel pressure within the delivery pipe, the target value for the fuel pressure set according to processing (not illustrated), etc., and then this processing is ended. High-pressure fuel is thereby discharged from the fuel pump.

In the case of the determination in Step S2 being YES, i.e. in the case of being within a period in which fuel injection is stopped, the CPU performs processing to update the aforementioned inhibition flag F_PUMP_NG (Step S5), and then advances to Step S6. In the case of fuel not being injected from the injectors, the electrical charge stored in the booster capacitor of the booster circuit will not be discharged in order to drive the injectors. For this reason, if continually driving the fuel pump, there is a risk of the booster circuit reaching excessive voltage rise, or the surplus power consumption circuit reaching excessive temperature rise. As explained by referencing FIG. 8 later, in the processing of Step S5, the value of the inhibition flag F_PUMP_NG is updated at the appropriate timing so that this booster circuit and surplus power consumption circuit are protected, and energization control of the fuel pump is performed or stopped.

In Step S6, it is determined whether or not the inhibition flag F_PUMP_NG is i.e. whether or not currently being a state in which driving of the fuel pump is inhibited. In the case of the determination in Step S6 being NO, the drive signal is generated as mentioned above (Step S4). In the case of the determination in Step S6 being YES, the drive signal during the present discharge cycle is set to OFF, and this processing is ended.

Figure 8:
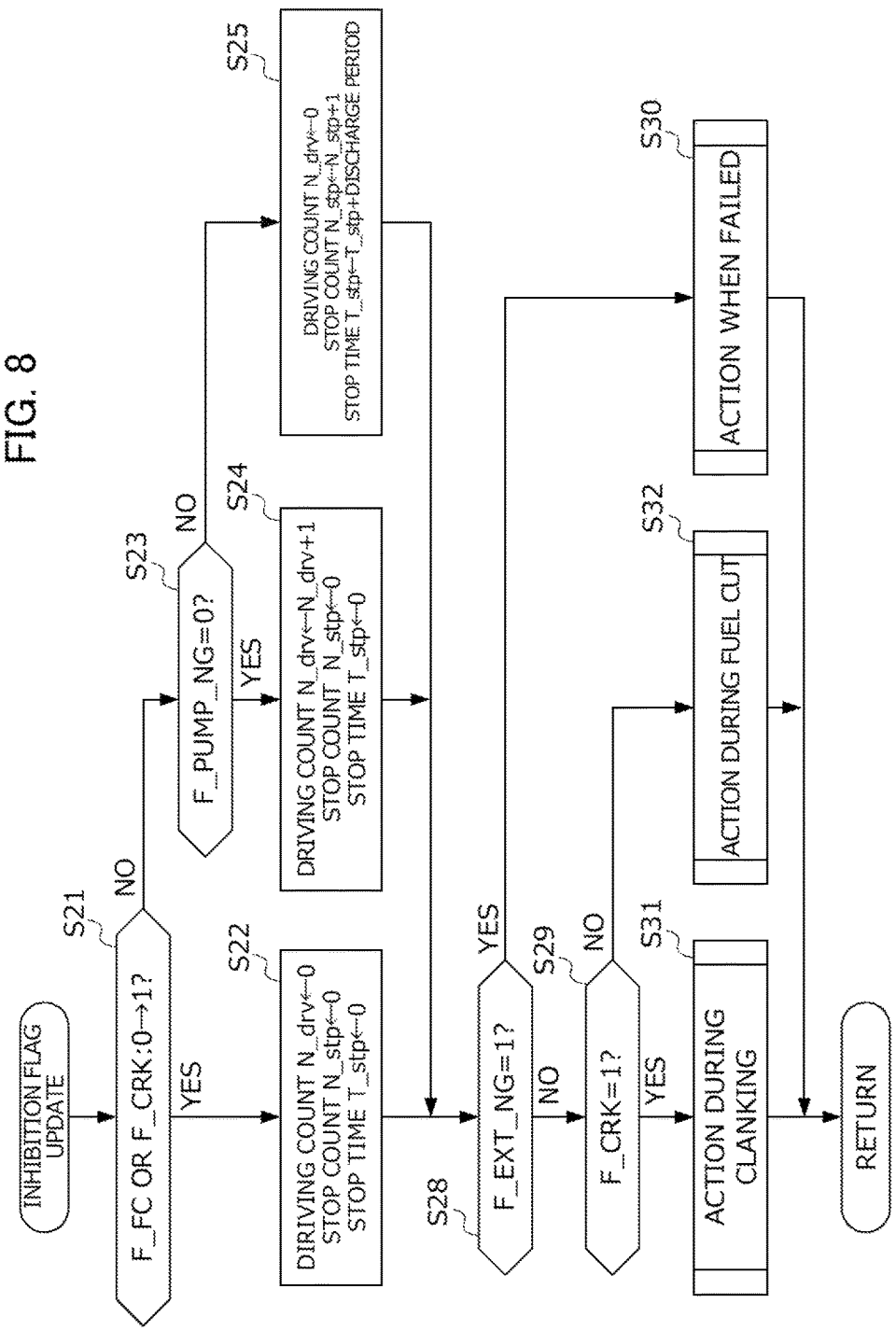
FIG. 8 is a flowchart for processing to update an inhibition flag.

FIG. 8 is a flowchart showing the specific sequence of processing to update the inhibition flag F_PUMP_NG. This processing is executed every discharge cycle of the fuel pump as a subroutine of the processing in FIG. 7, in the period in which the fuel injection from the injectors is stopped (during cranking or during fuel cut).

Before explaining the specific sequence of processing in FIG. 8, an outline of the processing in FIG. 8 will be explained. In the processing of FIG. 8, a drive count counter, stop count counter and stop time timer described later are defined (refer to Steps S21 to S25 in FIG. 8), and the inhibition flag F_PUMP_NG within the period in which fuel injection is stopped is updated using the discrete values from these counters and timer (refer to Steps S28 to S32 in FIG. 8). Herein, the periods in which fuel injection is stopped is divided into the three types of (1) period during cranking and in which the surplus power consumption circuit is normal (F_CRK=1 and F_EXT_NG=0), (2) period during fuel cut and in which surplus power consumption circuit is normal (F_FC=1 and F_EXT_NG=0), and (3) period in which surplus power consumption circuit is failing (F_EXT_NG=1). In the processing of FIG. 8, the inhibition flag F_PUMP_NG is updated based on respectively different algorithms depending on these three cases.

The drive count counter is a counter that counts the number of times that the fuel pump was driven within a period for which stopping fuel injection. Hereinafter, the discrete value (integer of 0 or greater) according to this drive count counter is indicated by N_drv. The stop count counter is a counter that counts the number of times stopping the driving of the fuel pump and the pump shaft idling within a period for which stopping fuel injection. Hereinafter, the discrete value (integer of 0 or greater) according to this stop count counter is indicated by N_stop. The stop time timer is a timer that measures the time for which stopping the driving of the fuel pump and the pump shaft idling within a period for which stopping fuel injection. Hereinafter, the discrete value (real number of 0 or greater) according to this stop time timer is indicated by T_stop.

In Step S21, the CPU determines whether or not either of the flag F_FC and F_CRK switched from "0" to "1" from the previous time to the present time, i.e. whether or not a period for which stopping fuel injection started from the previous time until the present time. In the case of the determination in Step S21 being YES, the processing advances to Step S22, resets the discrete values of the drive count counter, stop count counter and stop time timer all to the initial values (N_drv=N_stop=T_stp=0), and then advances to Step S28.

In the case of the determination in Step S21 being NO, the CPU advances to Step S23, and determines whether the inhibition flag F_PUMP_NG is "0". Herein, in the case of the inhibition flag F_PUMP_NG being "0", it means that the fuel pump was driven in the discharge cycle of the previous time. In addition, in the case of the inhibition flag F_PUMP_NG being "1", it means that driving of the fuel pump was stopped in the discharge cycle of the previous time. Consequently, in the case of the determination in Step S23 being YES, the CPU advances to Step S24, adds "1" to the discrete value N_drv of the drive count counter, resets the discrete values of the stop count counter and stop time timer to the initial values (N_stp=T_stp=0), and then advances to Step S28. In addition, in the case of the determination in Step S23 being NO, the CPU advances to Step S25, adds "1" to the discrete value N_stp of the stop count counter, adds the discharge cycle of the previous time to the discrete value T_stp of the stop time timer, resets the discrete value N_drv of the drive count counter to the initial value, and then advances to Step S28.

In Step S28, the CPU determines whether the surplus power consumption circuit is failing, i.e. whether the surplus power consumption circuit flag F_EXT_NG is 1. In the case of the determination in Step S28 being YES, the CPU advances to Step S30, and executes action during failure of the surplus power consumption circuit (refer to FIGS. 13 and 14 described later). In the case of the determination in Step S28 being NO, the CPU advances to Step S29, and determines whether the flag F_CRK is "1". In the case of the determination in Step S29 being YES, i.e. in the case of stopping the injection of fuel due to currently being during cranking, the CPU advances to Step S31, and executes an action during cranking (refer to FIGS. 9 and 10 described later). In addition, in the case of the determination in Step S29 being NO, i.e. in the case of stopping the injection of fuel due to currently being during fuel cut, the CPU advances to Step S32, and executes an action during fuel cut (refer to FIGS. 11 and 12 described later).

Figure 9:
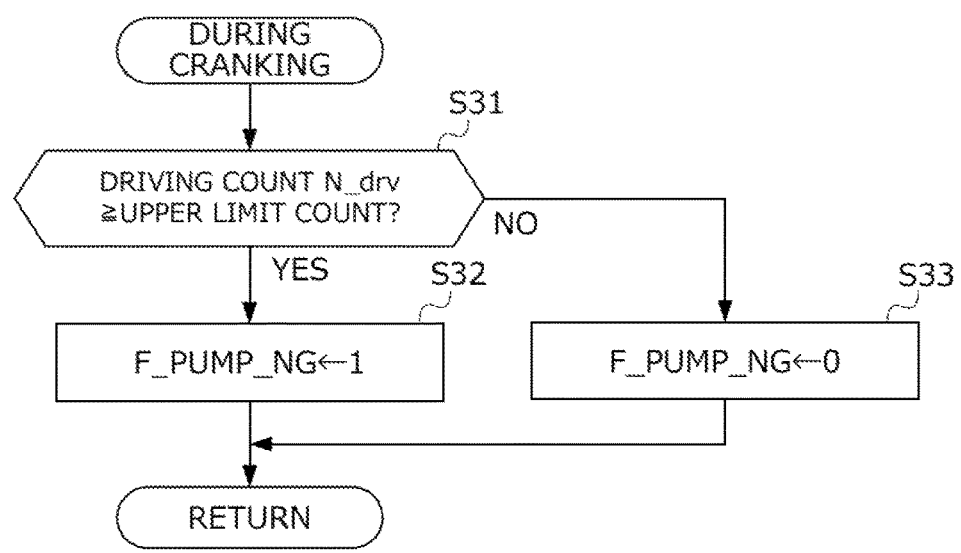
FIG. 9 is a flowchart showing a sequence of updating an inhibition flag during cranking.

FIG. 9 is a flowchart showing a sequence of updating the inhibition flag during cranking. In Step S31, the CPU determines whether the discrete value N_drv of the drive count counter is at least a predetermined upper limit count. This upper limit count is set in order to prevent the surplus power consumption circuit from excessively rising in temperature due to the surge current generated whenever driving the fuel pump, and is on the order of 160 times, for example. In the case of the determination in Step S31 being YES, the CPU sets the inhibition flag F_PUMP_NG to "1", and ends this processing. In addition, in the case of the determination in Step S31 being NO, the CPU sets the inhibition flag F_PUMP_NG to "0", and ends this processing. The driving of the fuel pump during cranking is thereby permitted until the driving count exceeds the upper limit count, and after the driving count has exceeded the upper limit count, it is inhibited until cranking is completed and fuel injection from the injectors is permitted (until F_CRK becomes "0").

Figure 10:
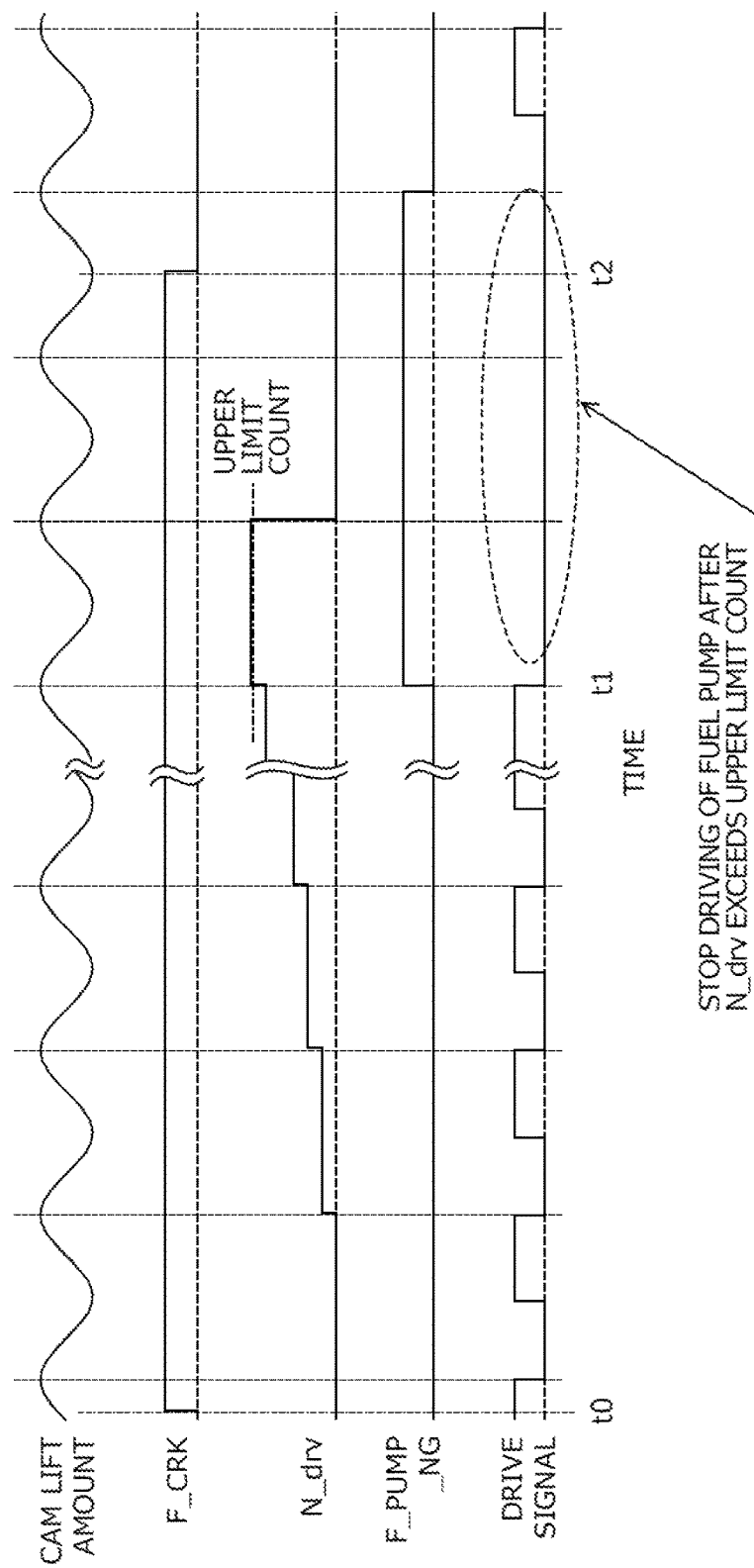
FIG. 10 is a time chart in a case of repeatedly executing the processing of FIG. 9.

FIG. 10 is a time chart for a case of repeatedly executing the processing of FIG. 9. More specifically, FIG. 10 is a graph showing the change in the discrete value N_drv of the drive count counter, inhibition flag F_PUMP_NG and drive signal in the case of starting cranking at time t0, and cranking having completed at time t2 thereafter.

As explained by referencing FIGS. 8 and 9, in the case of being a period in which fuel injection from the injectors is stopped and being during cranking, the CPU counts the driving count of the fuel pump since the moment of starting cranking, and generates a drive signal every discharge cycle in order to command execution of energization control until the discrete value N_drv exceeds the upper limit count. Then, after the discrete value N_drv for the driving count exceeded the upper limit count at time t1, the CPU turns OFF the drive signal in order to command stopping of energization control until cranking is completed, and fuel injection from the injectors is started at time t2. It is thereby possible to prevent the surplus power consumption circuit from reaching excessive temperature rise.

Figure 11:
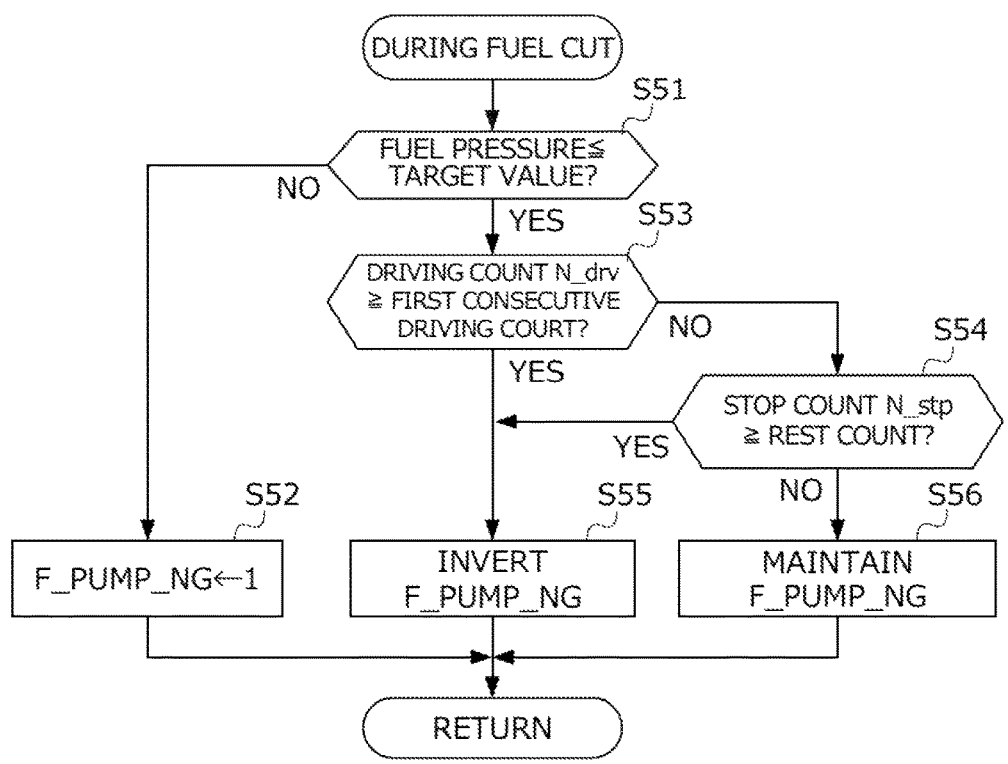
FIG. 11 is a flowchart showing a sequence of updating an inhibition flag during fuel cut.

FIG. 11 is a flowchart showing a sequence of updating the inhibition flag during fuel cut. In Step S51, the fuel pressure within the delivery pipe is acquired, and it is determined whether the fuel pressure is no higher than a target value thereof. In the case of the determination in Step S51 being NO, the CPU judges as being unnecessary to drive the fuel pump, advances to Step S52, and then sets the inhibition flag F_PUMP_NG to "1". In the case of the determination in Step S51 being YES, the CPU advances to Step S53, and executes intermittent operation to alternately perform driving and resting of the fuel pump as explained below.

In Step S53, the CPU determines whether the discrete value N_drv of the drive count counter is at least a predetermined first consecutive driving count. This first consecutive driving count is set in order to prevent the surplus power consumption circuit from excessively rising in temperature due to the surge current generated whenever driving the fuel pump. In addition, this first consecutive driving count is set to a value smaller than the upper limit count in FIG. 9 and, for example, is on the order of 5 times. In the case of the determination in Step S53 being NO, the CPU advances to Step S54, and determines whether the discrete value N_stp of the stop count counter is at least a predetermined rest count. This rest count is set in order to prevent the surplus power consumption circuit from excessively rising in temperature due to surge current and, for example, is on the order of 5 times.

In the case of the determination in Step S53 or S54 being YES, the CPU advances to Step S55, and reverses the inhibition flag F_PUMP_NG from the previous value. In other words, in the case of the previous value for the inhibition flag F_PUMP_NG being "0", it is switched to "1", and in the case of the previous value being "1", it is switched to "0". In addition, in the case of the determination in Step S53 or S54 being NO, the CPU advances to Step S56, and then maintains the inhibition flag F_PUMP_NG as is at the previous value. In the processing of FIG. 11, in the case of being during fuel cut and the fuel pressure being no more than the target value, the driving and resting of the fuel pump are thereby alternately switched.

Figure 12:
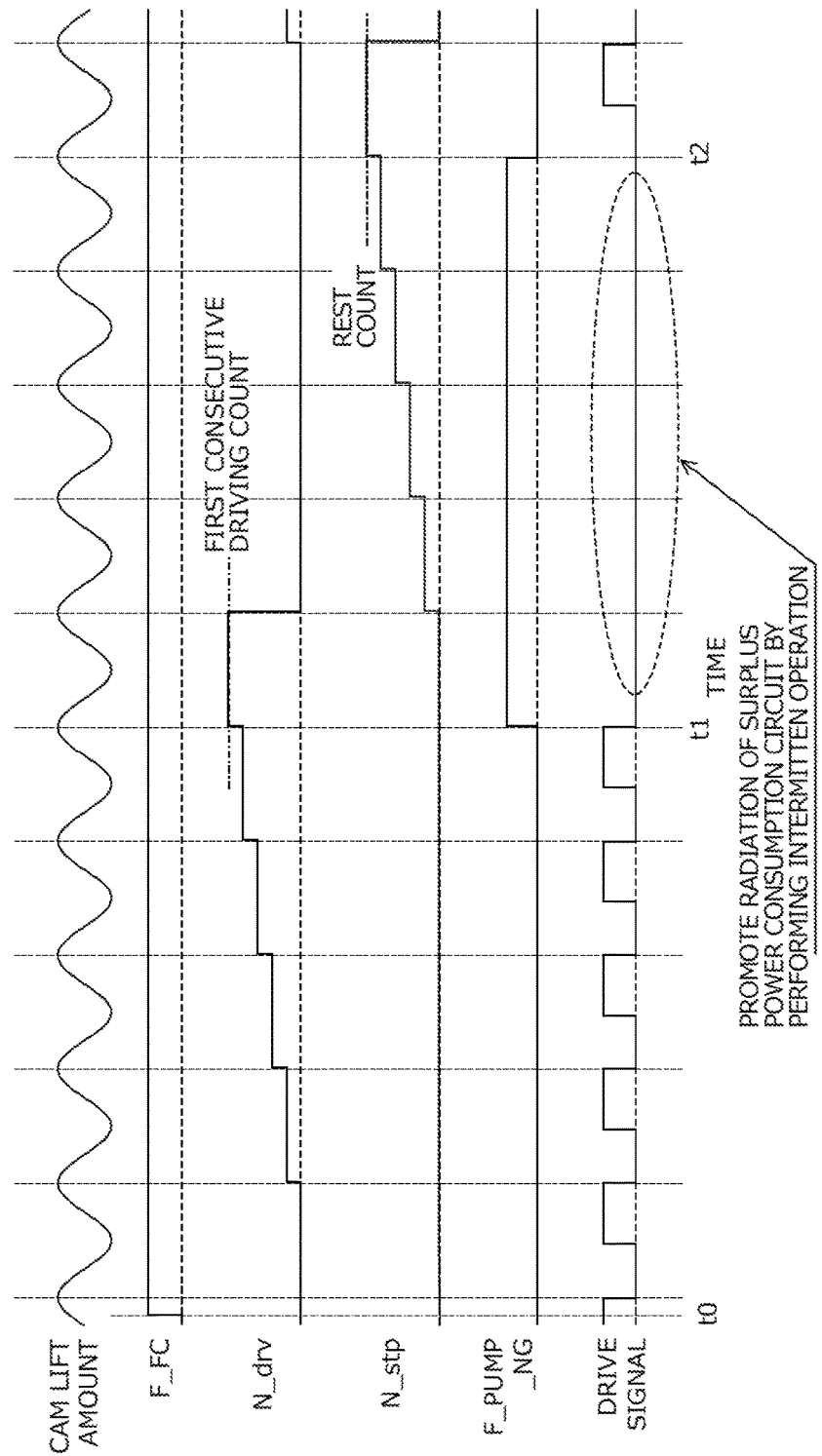
FIG. 12 is a time chart in a case of repeatedly executing the processing of FIG. 11.

FIG. 12 is a time chart for a case of repeatedly executing the processing of FIG. 11. More specifically, FIG. 5 is a graph showing the changes in the discrete value N_drv of the drive count counter, discrete value N_stp of the stop count counter, inhibition flag F_PUMP_NG and the drive signal, for a case of starting fuel cut from time t0.

As explained by referencing FIGS. 8 and 11, in the case of being during fuel cut and the fuel pressure within the delivery pipe being no more than the target value thereof, the CPU generates a drive signal every discharge cycle until the time t1 at which the discrete value N_drv of the drive count counter exceeds the first consecutive driving count, and subsequently repeatedly performs intermittent operation to turn OFF the drive signal until the time t2 at which the discrete value N_stp of the stop count counter exceeds the rest count. Since the period for which promoting radiation of the surplus power consumption circuit having risen in temperature due to continually driving the fuel pump can thereby be secured intermittently, it is possible to prevent an excessive temperature rise of the surplus power consumption circuit.

Figure 13:
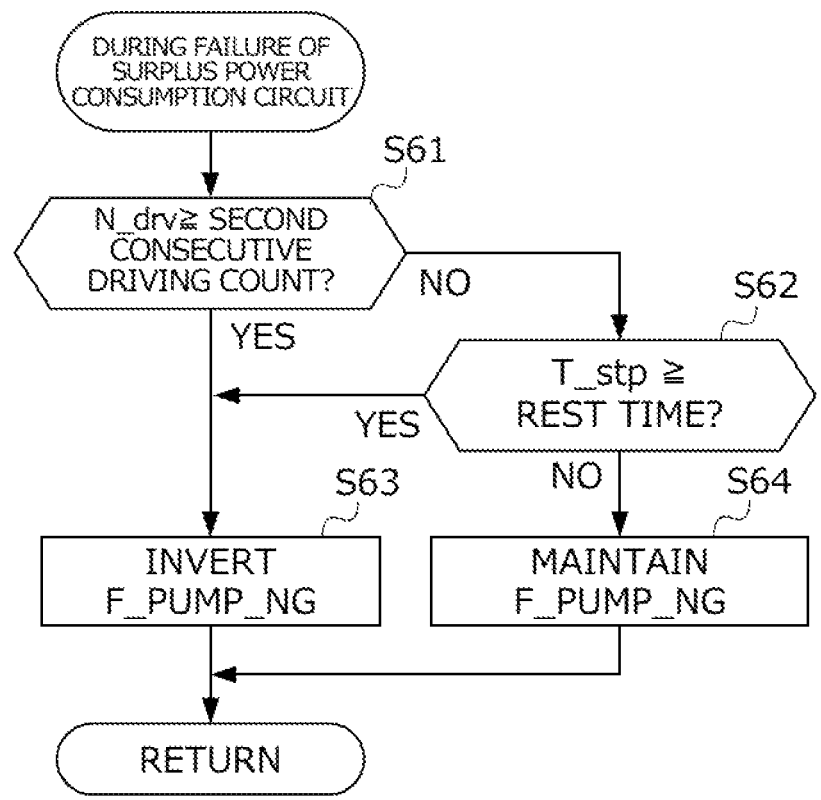
FIG. 13 is a flowchart showing a sequence of updating an inhibition flag when a surplus power consumption circuit has failed.

FIG. 13 is a flowchart showing a sequence of updating the inhibition flag when the surplus power consumption circuit has failed. In the case of the surplus power consumption circuit failing, since the surge current generated whenever driving the fuel pump is supplied to the booster circuit even if the boosted voltage VS exceeds the protection voltage VL, there is concern over the booster circuit reaching excessive voltage rise, if continuously driving the fuel pump successively. Therefore, in the processing of FIG. 13, intermittent operation that alternately performs driving and resting of the fuel pump is executed as explained below.

In Step S61, the CPU determines whether the discrete value N_drv of the drive count counter is at least a predetermined second consecutive driving count. This second consecutive driving count is set in order to prevent the booster circuit from reaching excessive voltage rise due to surge current and, for example, is on the order of 20 times. In the case of the determination in Step S62 being NO, the CPU advances to Step S62, and determines whether the discrete value T_stp of the stop time timer is at least a predetermined rest time. This rest time is set in order to prevent the booster circuit from reaching excessive voltage rise due to surge current and, for example, is on the order of 12 seconds.

In the case of the determination in Step S61 or S62 being YES, the CPU advances to Step S63, and then reverses the inhibition flag F_PUMP_NG from the previous value. In other words, in the case of the previous value of the inhibition flag F_PUMP_NG being "0", it is switched to "1", and in the case of the previous value being "1", it is switched to "0". In addition, in the case of the determination in Step S61 or S62 being NO, the CPU advances to Step S64, and then maintains the inhibition flag F_PUMP_NG as is at the previous value. In the processing of FIG. 13, in the case of being an period in which fuel injection is stopped and the surplus power consumption circuit is failing, the driving and resting of the drive pump is thereby alternately switched.

FIG. 14 is a time chart for a case of repeatedly executing the processing of FIG. 13. More specifically, FIG. 14 is a graph showing the changes in the discrete value N_drv of the drive count counter, discrete value T_stp of the stop time timer, inhibition flag F_PUMP_NG and the drive signal for the case of failure of the surplus power consumption circuit being detected at time t0 during fuel cut (F_FC=1).

As explained by referencing FIGS. 8 and 13, in the case of being within a period in which fuel injection is stopped and failure of the surplus power consumption circuit is detected, the CPU generates a drive signal every discharge cycle until time t1 at which the discrete value N_drv of the drive count counter exceeds a second consecutive driving count, and subsequently, repeatedly performs intermittent operation to turn OFF the drive signal until the discrete value T_stp of the stop time timer exceeds the rest time. Since the period of lowering the boosted voltage raised by driving the fuel pump by way of leakage current can thereby be ensured intermittently, it is possible to prevent an excessive voltage rise of the booster circuit, even in a case of the surplus power consumption circuit having failed.

Although an embodiment of the present invention has been explained above, the present invention is not to be limited thereto. The configuration of detailed parts may be modified as appropriate within the scope of the gist of the present invention.

For example, in the above-mentioned embodiment, a case of applying the present invention to a fuel injection system equipped to a hybrid vehicle is explained; however, the present invention is not limited thereto. Since cranking of the engine is performed using a motor for travel in the vehicle in motion with a hybrid vehicle, the revolution speed of the engine during cranking is higher than a case of performing cranking using a smaller scale starter motor, and thus the discharge cycle of the fuel pump is shorter. For this reason, in the fuel injection system equipped to a hybrid vehicle, since the load acting on the surplus power consumption circuit or booster circuit is greater, the present invention is considered particularly suited to fuel injection systems equipped to hybrid vehicles. However, the present invention may be applied to a fuel injection system equipped to a vehicle that cranks with a small-scale starter motor that is not a motor for travel.

In addition, in the above-mentioned embodiment, a case of configuring the surplus power consumption circuit 65 by existing electronic components such as Zener diodes and resistor elements is explained; however, the present invention is not limited thereto. This surplus power consumption circuit, for example, may be configured as a battery regeneration circuit that returns the surplus energy of the capacitor to a battery (not illustrated).

EXPLANATION OF REFERENCE NUMERALS

V vehicle (hybrid vehicle)
M motor (electric motor)
1 engine (internal combustion engine)
S fuel injection system
3 delivery pipe
4 injector
5 high-pressure fuel pump (fuel pump)
55 flow-rate control valve (electromagnetic valve)
6 ECU (control device)
61 fuel-pump drive circuit
62 booster circuit (injector drive circuit)
625 capacitor (power storage element)
63 CPU (compression command generation device, failure detection device)
64 charging circuit
65 surplus power consumption circuit

The invention claimed is:

1. A control device for a fuel injection system that injects fuel compressed by a fuel pump from an injector of an internal combustion engine, the control device comprising:
   a compression command generation device that commands compression by way of the fuel pump;
   a fuel-pump drive circuit that performs energization control of an electromagnetic valve of the fuel pump based on a command from the compression command generation device;
   an injector drive circuit that includes a power storage element for storing electric power to be used in driving of the injector;
   a charging circuit that leads current generated during energization stop of the electromagnetic valve to the power storage element; and
   a surplus power consumption circuit that consumes surplus electric power of the power storage element,
   wherein the compression command generation device counts a driving count of the fuel pump in a period for which fuel injection from the injector is stopped, and commands stopping of the energization control in response to the driving count exceeding a predetermined count.

2. The control device for a fuel injection system according to claim 1, wherein the compression command generation device, in a case of being during cranking of the internal combustion engine, commands execution of the energization control until the driving count counted since a moment of starting the cranking exceeds a predetermined upper limit count, and after the driving count exceeds the upper limit count, commands stopping of the energization control.

3. The control device for a fuel injection system according to claim 2, the predetermined upper limit count is decided in order to protect the surplus power consumption circuit.

4. The control device for a fuel injection system according to claim 2,
   wherein the fuel injection system is equipped to a hybrid vehicle with an electric motor and the internal combustion engine as motive power sources to cause a drive wheel to rotate, and
   wherein the cranking is performed by way of the electric motor.

5. The control device for a fuel injection system according to claim 1,
   wherein the fuel injection system includes a delivery pipe that stores high-pressure fuel compressed by the fuel pump, and
   wherein the compression command generation device, in a case of being during fuel cut accompanying deceleration of the internal combustion engine and fuel pressure within the delivery pipe being no more than a predetermined value, continually commands execution of the energization control until the driving count exceeds a predetermined first consecutive count, and then repeatedly performs intermittent operation to continually command stopping of the energization control until a predetermined first rest period elapses.

6. The control device for a fuel injection system according to claim 5, wherein the predetermined first consecutive count and first rest interval are decided in order to protect the surplus power consumption circuit.

7. The control device for a fuel injection system according to claim 1, the control device further comprising a failure detection device that detects an event of the surplus power consumption circuit having failed,
   wherein, in a case of being within a period in which fuel injection from the injector is stopped and failure of the surplus power consumption circuit is detected, the compression command generation device continually commands execution of the energization control until the driving count exceeds a predetermined second consecutive count, and then repeatedly performs intermittent operation to continually command stopping of the energization control until a predetermined second rest interval elapses.

8. The control device for a fuel injection system according to claim 7, wherein the predetermined second consecutive count and the second rest interval are decided in order to protect the injector drive circuit.

* * * * *